United States Patent
Caritey et al.

(10) Patent No.: US 8,240,380 B2
(45) Date of Patent: Aug. 14, 2012

(54) POLYMERS AND NANOPARTICLES FORMULATIONS WITH SHEAR-THICKENING AND SHEAR-GELLING PROPERTIES FOR OILFIELD APPLICATIONS

(75) Inventors: Jean-Philippe Caritey, Le Plessis Robinson (FR); Mélanie Cady, Villebon sur Yvette (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 522 days.

(21) Appl. No.: 12/441,261

(22) PCT Filed: Sep. 13, 2007

(86) PCT No.: PCT/EP2007/007975
§ 371 (c)(1),
(2), (4) Date: Oct. 5, 2009

(87) PCT Pub. No.: WO2008/034553
PCT Pub. Date: Mar. 27, 2008

(65) Prior Publication Data
US 2010/0071893 A1   Mar. 25, 2010

(30) Foreign Application Priority Data
Sep. 20, 2006   (EP) .................................... 06291481

(51) Int. Cl.
*E21B 33/138*   (2006.01)
*E21B 43/22*    (2006.01)
*C09K 8/58*     (2006.01)
*C09K 8/588*    (2006.01)

(52) U.S. Cl. ........ 166/270; 166/268; 166/275; 166/292; 166/294; 166/400; 507/203; 507/211; 507/219; 507/261; 507/936; 523/130

(58) Field of Classification Search ........................ None
See application file for complete search history.

(56) References Cited

U.S. PATENT DOCUMENTS

| | | | | |
|---|---|---|---|---|
| 3,663,477 A * | 5/1972 | Ahearn | ........................... | 516/41 |
| 3,836,465 A * | 9/1974 | Rhudy et al. | .................. | 507/108 |
| 3,882,939 A * | 5/1975 | McAtee et al. | .............. | 166/400 |
| 4,212,747 A * | 7/1980 | Swanson | ....................... | 507/220 |
| 4,442,241 A * | 4/1984 | Drake et al. | .................. | 523/130 |
| 4,475,594 A * | 10/1984 | Drake et al. | .................. | 166/294 |
| 4,503,170 A * | 3/1985 | Drake et al. | .................. | 523/130 |
| 4,530,402 A * | 7/1985 | Smith et al. | .................. | 166/291 |
| 2004/0266629 A1* | 12/2004 | Maroy et al. | .................. | 507/200 |

FOREIGN PATENT DOCUMENTS

| | | |
|---|---|---|
| EP | 1591619 | 2/2005 |
| WO | 9938931 | 5/1999 |
| WO | 02102917 | 12/2002 |
| WO | 2006056774 | 1/2006 |

* cited by examiner

*Primary Examiner* — George Suchfield
(74) *Attorney, Agent, or Firm* — Matthias Abrell

(57) ABSTRACT

Compositions having shear-gelling and shear-thickening properties are based on an amphiphilic polymer combined with hydrophilic particles and polyethyleneoxide. The hydrophilic particles preferably consist of a hydrous sodium lithium magnesium silicate. The amphiphilic polymer may be a synthetic polymer, a hydrophobically modified biopolymer, or both. The compositions may be employed in enhanced oil recovery operations.

8 Claims, 6 Drawing Sheets

POLYMERS AND NANOPARTICLES FORMULATIONS WITH SHEAR-THICKENING AND SHEAR-GELLING PROPERTIES FOR OILFIELD APPLICATIONS

FIELD OF THE INVENTION

The present invention broadly relates to polymers formulation and more precisely to nanoparticles with shear thickening and shear gelling properties for oilfield applications.

DESCRIPTION OF THE PRIOR ART

Patent application EP1591619 discloses a method for enhanced oil recovery also called EOR applications using smart shear-gelling fluids to reduce the effective aperture of large fractures (and in a less extend fissure), and thus, average the flow conditions everywhere in the reservoir. These smart shear-gelling fluids with shear reversible properties can be formulated using amphiphilic synthetic water-soluble polymers.

The chemistry of such shear-gelling fluids polymers was disclosed in patent application EP1404776. The shear-gelling behavior is based on polymer/polymer interactions. These polymers have an associative behavior or thermo-associative in case they have lower critical solution temperature (LCST) groups in their structure. However, it may be difficult to develop them as industrial products because the synthesis process could be expensive and difficult to handle on a large scale. Other routes to get such smart fluids were necessary.

Therefore, the present invention proposes a novel system of polymers based on nanoparticles and polymers combinations which also exhibit shear-gelling properties but which are more easily and less expensively product industrially.

SUMMARY OF THE INVENTION

The invention discloses a composition having shear-gelling and shear-thickening properties based on an amphiphilic polymer combined with hydrophilic particles and polyethyleneoxide. Preferably, the hydrophilic particles are a synthetic clay of the type LAPONITE (registered Trade Mark). LAPONITE is a hydrous sodium lithium magnesium silicate with the following empirical formula $—Na^+_{0.7}[(Si_8Mg_{5.5}Li_{0.3})O_{20}(OH)_4]^-_{0.7}$. LAPONITE is manufactured by Rockwood Additives Ltd, Cheshire, UK and Southern Clay Products, Inc., Gonzales, Tex. USA. A full description of LAPONITE may be found in the following publication. Cummins, H Z: "Liquid, glass, gel: The phases of colloidal Laponite," *Journal of Non-Crystalline Solids* 353 (2007) 3891-3905. In a first type of embodiment, the amphiphilic polymer is a synthetic polymer. In a second type of embodiment, the amphiphilic polymer is a hydrophobically modified biopolymer.

Preferably, the ratio for respective concentrations LAPONITE/polyethyleneoxide is between 3.4 and 3.8 and preferably between 3.5 and 3.7 and more preferably around 3.6, and/or exactly 3.6.

In a second aspect of the present invention, a method for enhancing oil recovery in a subterranean formation is disclosed, in particular in non-homogeneous reservoir formations, the method including the step of injecting a shear-gelling fluid prior the injection of a shear-thickening fluid.

In non-homogeneous reservoir formations where permeability varies from one zone to the next, and in contrast to shear-thinning fluids, rheo-viscosifying fluids minimize the difference in fluid flow rate, reducing by-pass of low permeability zones. When reservoirs exhibit fractures, fluids that viscosify under shear reduce the extent to which porous zones are bypassed by the flooding fluid passing through or via the fracture path (for example in sandstone reservoirs), or to which the narrowest fractures are bypassed to the advantage of the largest fractures (for example, in carbonate reservoirs). Injecting a fluid that gels under shear, in conjunction with suitable pumping conditions, reduces the width of the largest fractures where shear is higher but does not reduce the width of the narrowest fractures where shear is lower. Thus, in fractured reservoirs, the best way to reduce oil by-pass consists firstly, in pumping a fluid that gels under shear, and then in pumping a fluid that viscosifies under shear.

This technique is primarily useful in formations containing crude oil among other fluids such as gas and/or water. The present invention is particularly advantageous for treating very low primary porosity (tight) reservoir in which fractures lead to very difficult EOR conditions. Oil is mainly stored within fractures and fissures of different apertures. These fractures are organized in two or several families which intersect at a given angle thus creating a preferential path in the direction of the intersection. Flow is known to be maximum in this direction. Depending on the orientation of the subsequent tectonics stresses, some fracture families are closed while the others are wide opened, this creates an important heterogeneity of permeabilities. The oil is preferentially trapped in the closed fractures and quickly flushed out of the open fractures.

The main advantage of the proposed method be is to be selective according to shear rates: this enables to selectively reduce the flow through the larger fractures without impairing the flow through the thinner fractures. The larger fractures are usually the main bypass of hydrocarbons for flooding water.

The second advantage is to be reversible and therefore non damageable to the reservoir. By reducing the injection rate to less than 10 times the injection rate adjusted to achieve the critical shear rate, it is possible to remove completely the gel formed in the fractures or by increasing the injection rate up to gel destruction.

BRIEF DESCRIPTION OF THE DRAWING

Further embodiments of the present invention can be understood with the appended drawings.

DETAILED DESCRIPTION

New systems based on nanoparticles and polymers combinations which exhibit shear-gelling properties are disclosed. The polymers used in such systems can also be either fully hydrophilic (for example PolyEthyleneOxide—PEO) or amphiphilic (associative polymers), obtained either from synthetic or natural chemistries (i.e. chemically modified biopolymers). Macromolecular parameters (molecular weight, grafting rates, conformation in solution (i.e. random coiled or rigid rod) of these different polymers can allow to optimize fluids properties, such as critical shear rates for liquid-to-gel transitions when shear is applied, or relaxation times for gel-to-liquid transition when applied shear is stopped. Hydrophilic particles (synthetic clay, nanosilica) can be used. But hydrophobic particles for example latex could also be formulated in combination with amphiphilic polymer with associative properties. Thus, the benefit is to provide, to play and to optimize a wide range of particle size down to nanolatex.

Shear-gelling systems according to the invention are of the first type as amphiphilic polymers combined with hydrophilic particles as synthetic clay and PolyEthyleneOxide (PEO) systems, wherein the polymers are synthetic polymers or of the second type, as amphiphilic polymers with hydrophilic particles as synthetic clay and PolyEthylene Oxide (PEO) systems, wherein the polymers are hydrophobically modified biopolymers.

Shear gelling properties were first evidenced and optimized, and the, validated according to the requirements of the method for EOR as explained in patent application EP1591619. FIGS. 1 to 5 show the process of optimization. The optimization process requires first to get LAPONITE/PEO systems for smart gelling fluids application. Also the systems LAPONITE/PEO need a best ratio for respective concentrations around 3.6. In a second step, the possible mixtures with amphiphilic polymers need to be optimized and/or adjusted to get shear-gelling properties versus application requirements, i.e. critical shear rate related to the pumping rate required during the operation, relaxation time related to the aperture network in the reservoir. A mixture of synthetic polymer or biopolymers can be used, which enable to optmize the inflect of the polymers conformation. Those parameters also adjusted as a function of temperature; effectively temperature reinforces hydrophobic associative behavior when temperature is increased.

FIGS. 1 to 4 shows the shear-thickening and shear-gelling behavior of the systems according to the invention.

Figure 1:
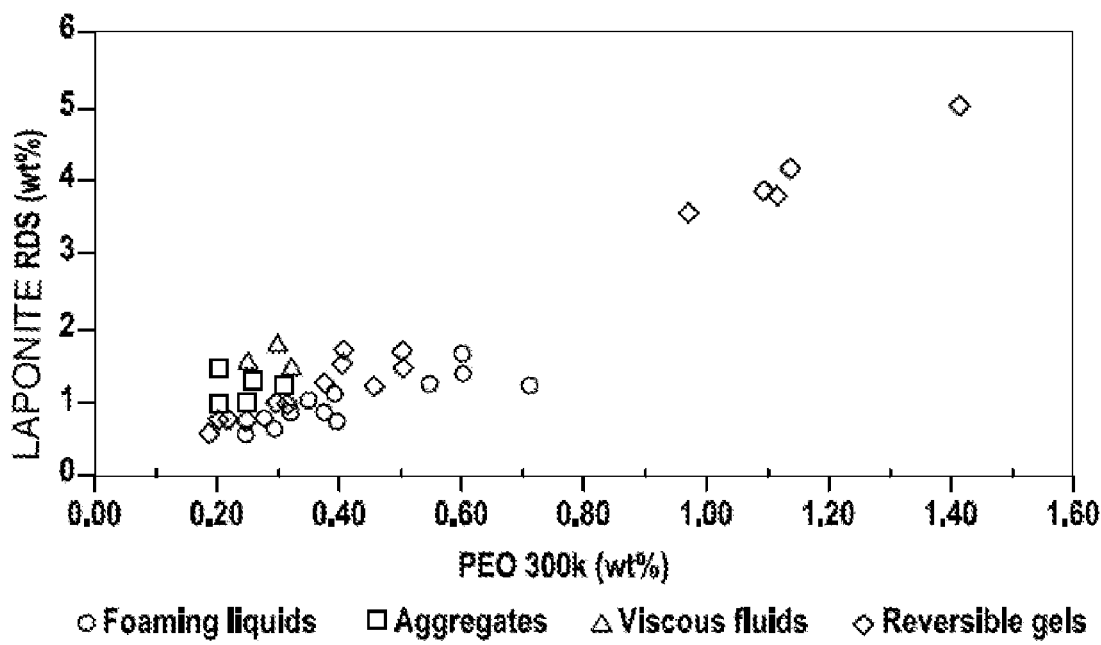
FIG. 1 describes the properties for different systems according to the invention at varying ratios of LAPONITE RDS and PEO.

FIG. 1 shows the properties for different systems at room temperature according to the invention at varying ratios of LAPONITE RDS and PEO, as it can be seen that reversible gels are the more suitable i.e. the best ratio for respective concentrations of LAPONITE/PEO is between 3.4 and 3.8 and preferably between 3.5 and 3.7 and more preferably around 3.6, and/or exactly 3.6.

Figure 2:
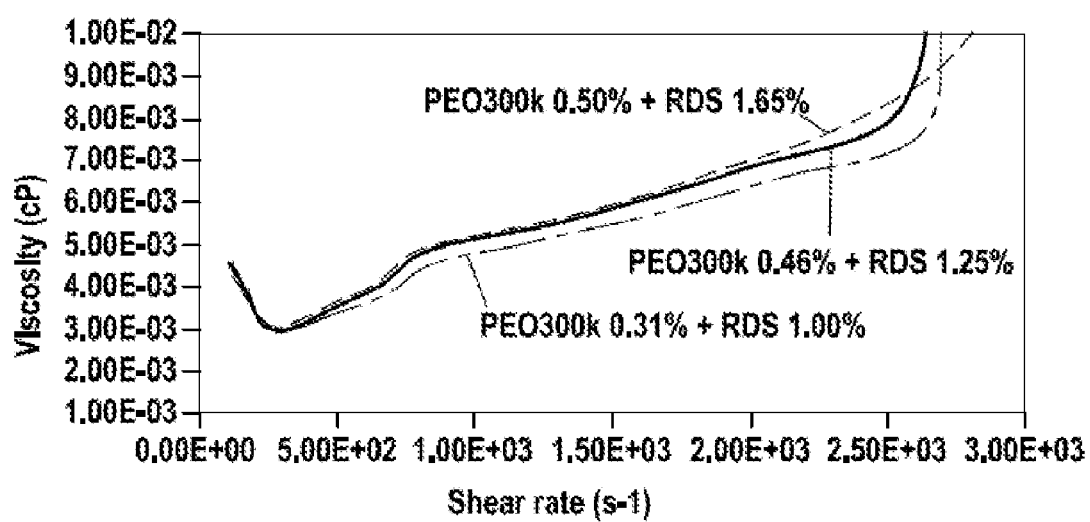
FIG. 2 shows the critical shear rate as a function of the global LAPONITE/PEO concentration.

FIG. 2 shows the critical shear rate as a function of the global LAPONITE/PEO concentration. The experiments were performed at room temperature. The critical shear rate is a function of the global concentration of respective components if the ratio is kept around the previous identified value around 3.6, and then, the systems are essentially shear thickening systems. With true shear-gelling systems, the critical shear rate is significantly decreased when the concentration increases. And when the ratio is above 3, stronger shear-gelling properties were observed.

Figure 3:
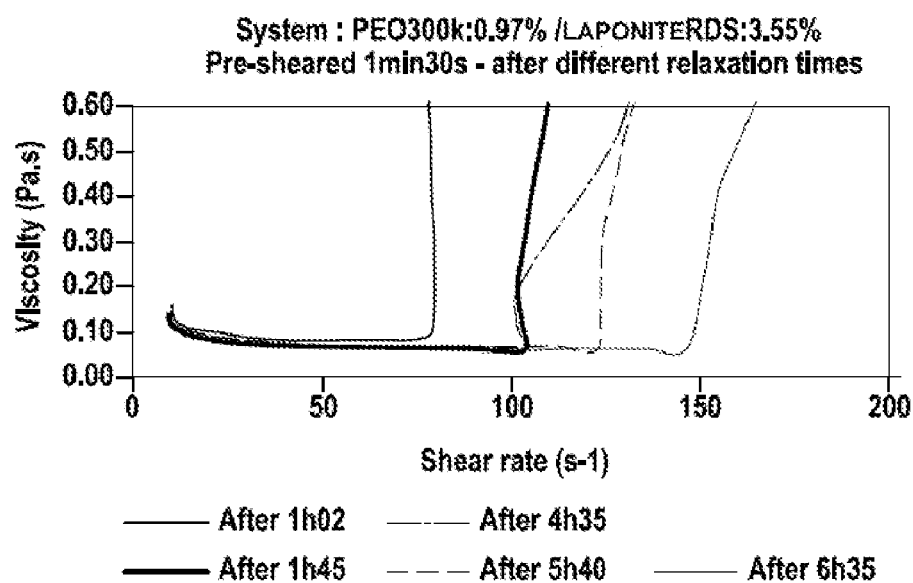
FIG. 3 shows the importance of the shear history for the systems according to the invention.
Figure 4:
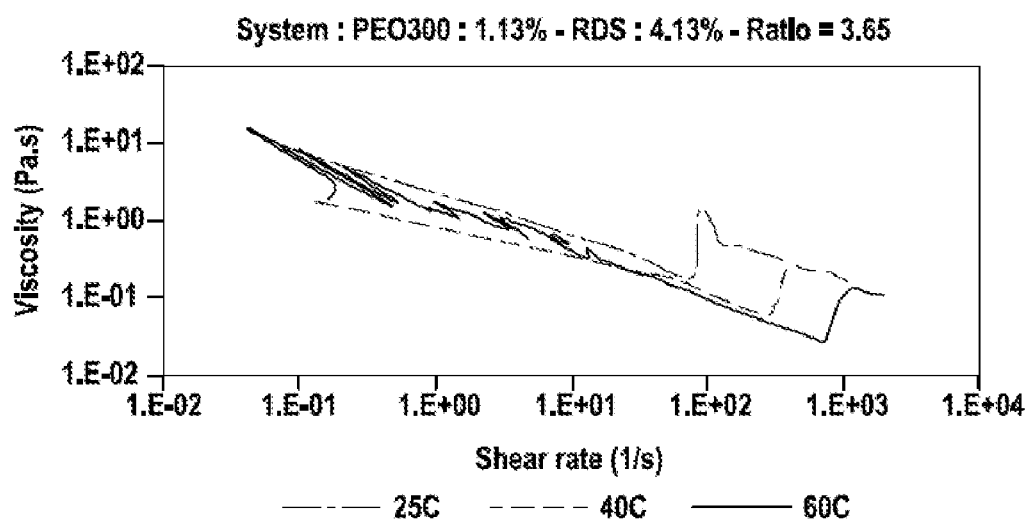
FIG. 4 shows viscosity versus shear rate for systems according to the invention.

FIG. 3 shows importance of the shear history for the systems according to the invention. Therefore the shear history is an important factor for those systems. FIG. 4 shows viscosity versus shear rate for systems according to the invention. These comparative tests at different temperatures were carried out. Temperature increase induces a shift of the critical shear rates towards higher values, but there is still a critical shear rate on this range with hydrophilic interactions.

Figure 5:
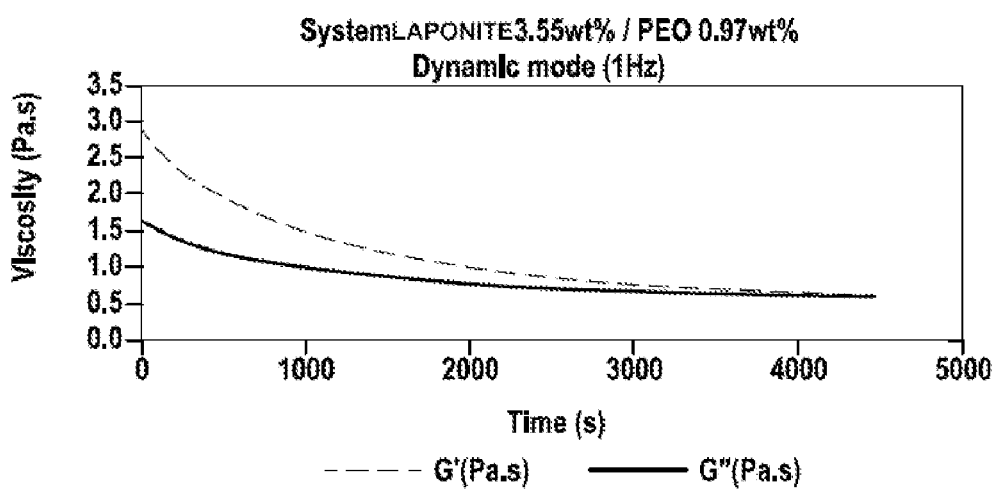
FIG. 5 shows the relaxation of systems according to the invention.

FIG. 5 shows the reversibility of the compositions according to the invention: gel to liquid transition when shear is not applied anymore. The experiments with dynamic rheological measurements (G', G") show the reversibility of such systems once shear is not applied anymore. Within some minutes, the systems are back to their initial viscous properties. This can be optimized playing with the selection of basic chemicals formulated as previously described.

Finally, a validation of their performance versus the requirement of the method for EOR with different apertures conditions (shape and dimension) was done. As there is no steady states and regimes when theses fluids are pumped, there is a strong importance of the parameters controlling existing cycles of gelation/relaxation. Experimental results with these systems showed that they can be used to modify flow conditions as per requirements of the method for EOR. Playing with the adjustment of the applied pressure to control shear rate in the aperture, allows to go above the critical shear rate, which activates the gelation and reduce the effective aperture to first decrease the flow in the bigger aperture and increase the flow in the smaller aperture.

FIGS. 6 to 9 show this validation per the requirements of the method for EOR as explained in patent application EP1591619.

Figure 6A:
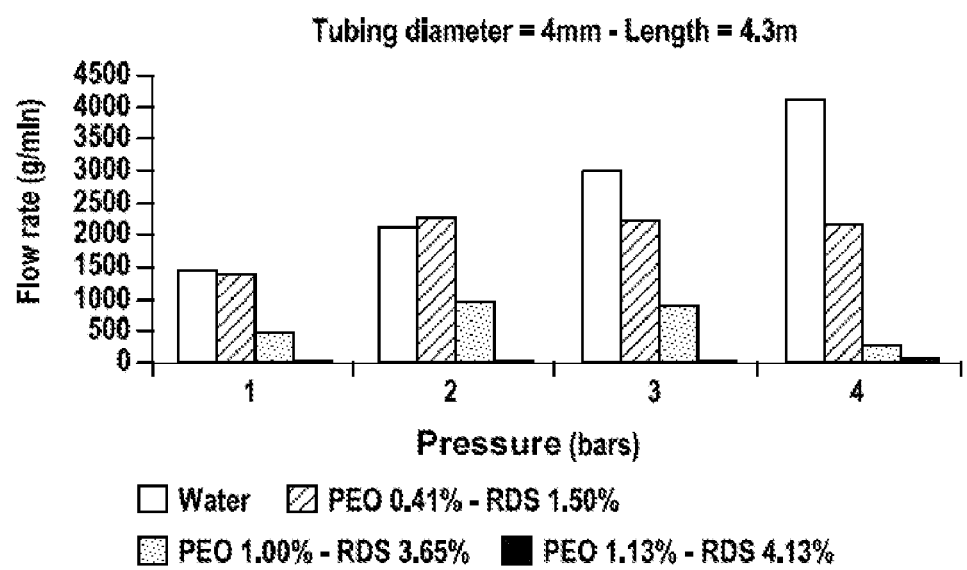
FIGS. 6A and 6B show the performance of systems according to the invention for EOR applications, using tubing.
Figure 6B:
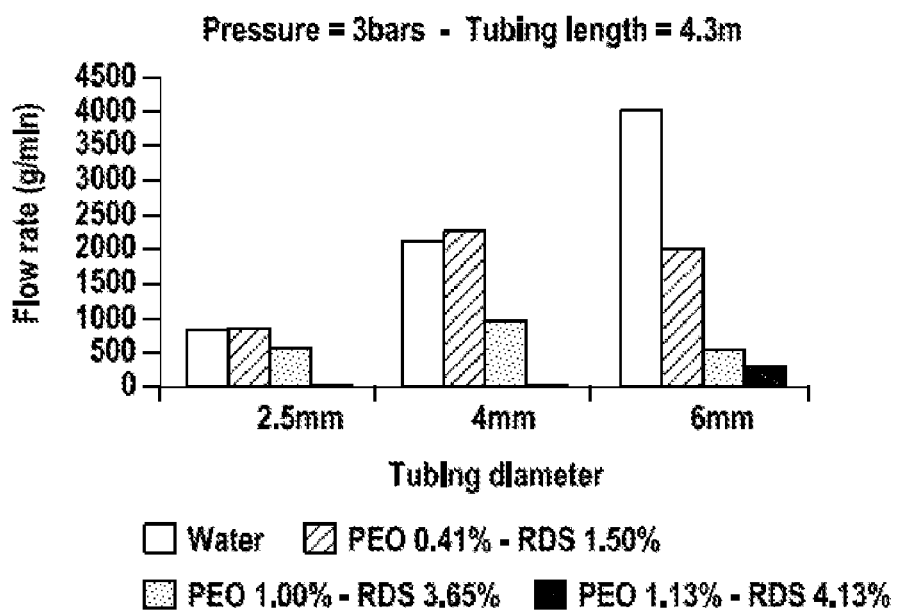
Figure 7:
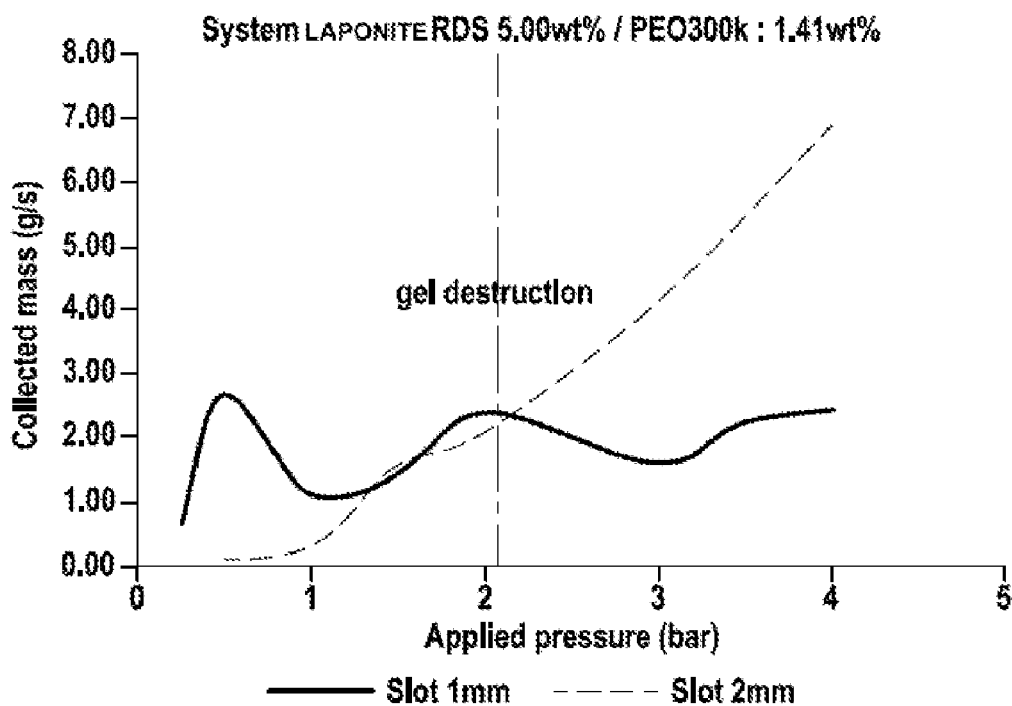
FIG. 7 shows the performance of systems according to the according to the invention for EOR applications, using a slot alone.
Figure 8A:
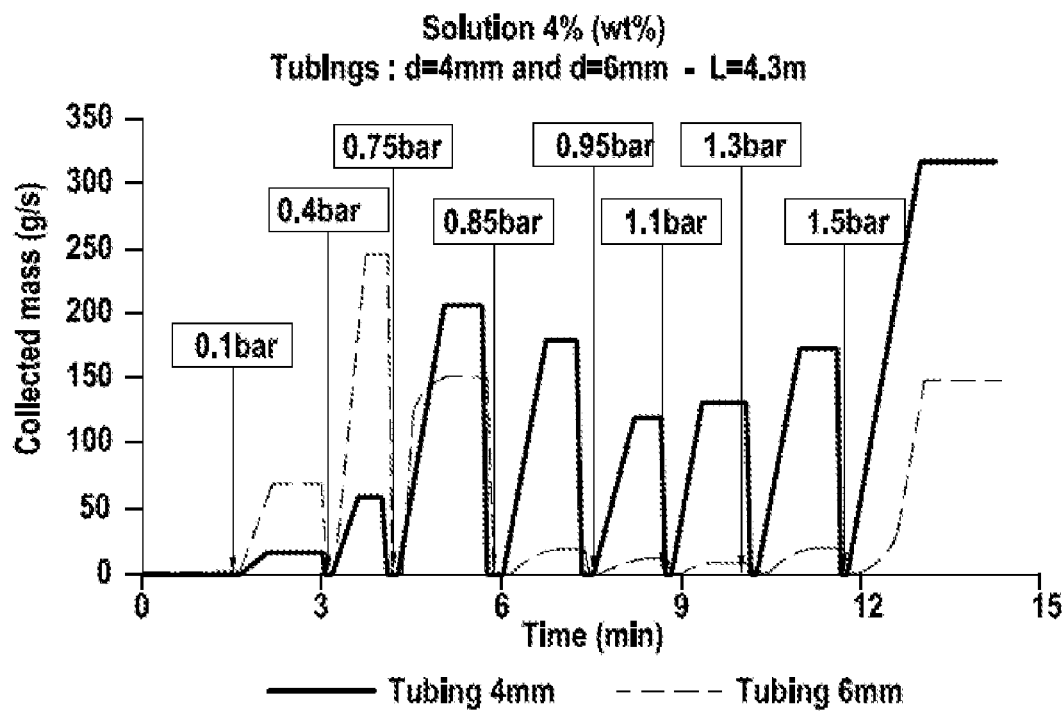
FIGS. 8A and 8B show the performance of systems according to the invention for EOR applications, using tubing combinations.
Figure 8B:
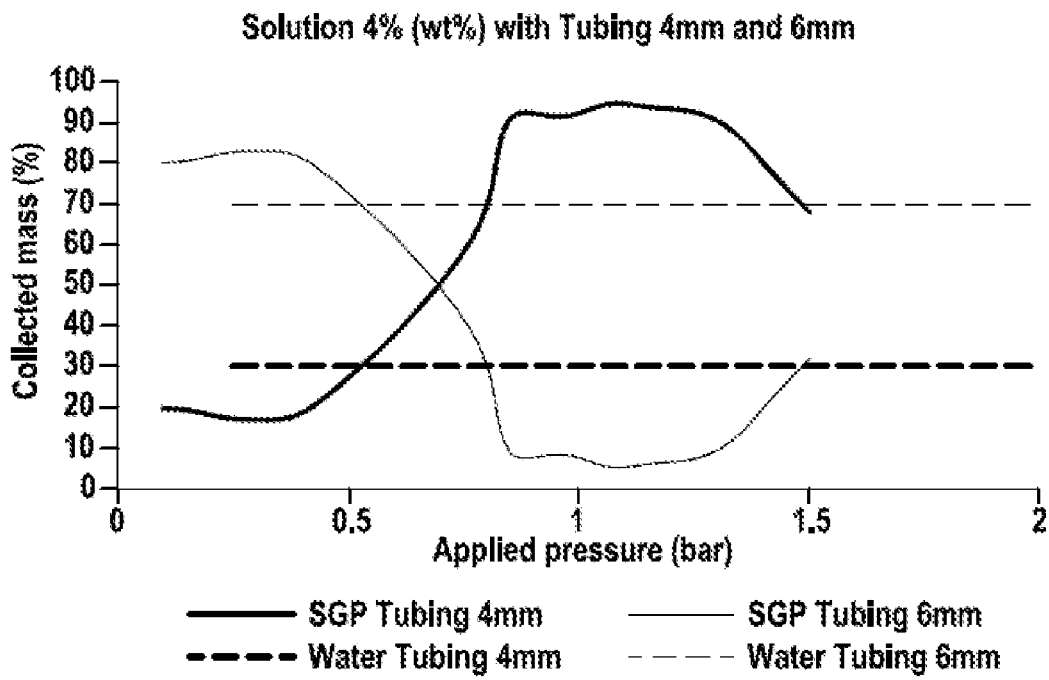
Figure 9A:
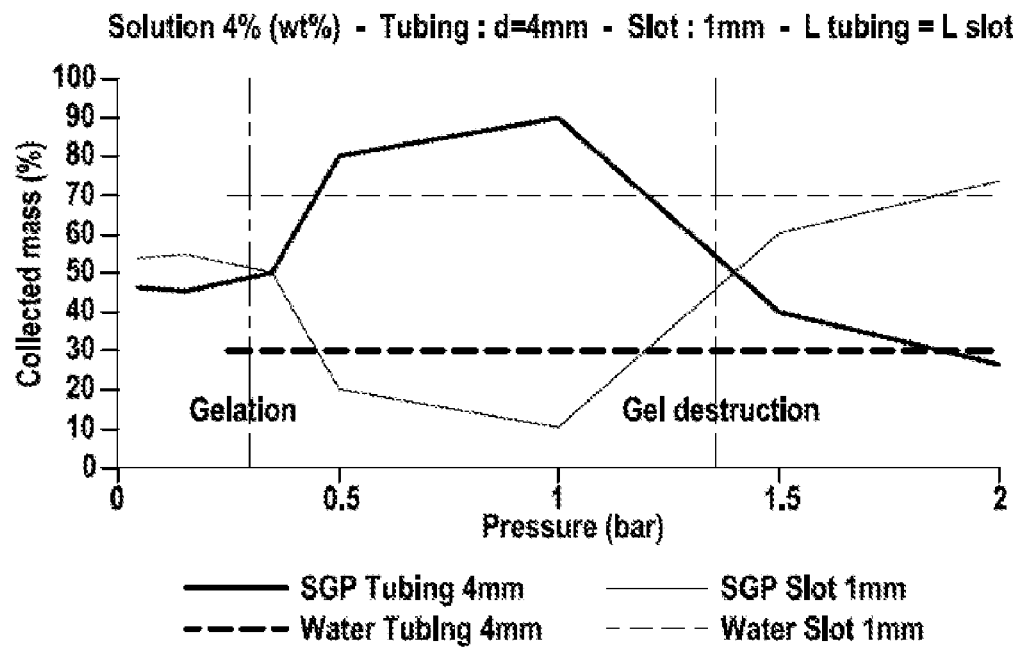
FIGS. 9A and 9B show the performance of systems according to the invention for EOR applications, using tubing/slot combinations.
Figure 9B:
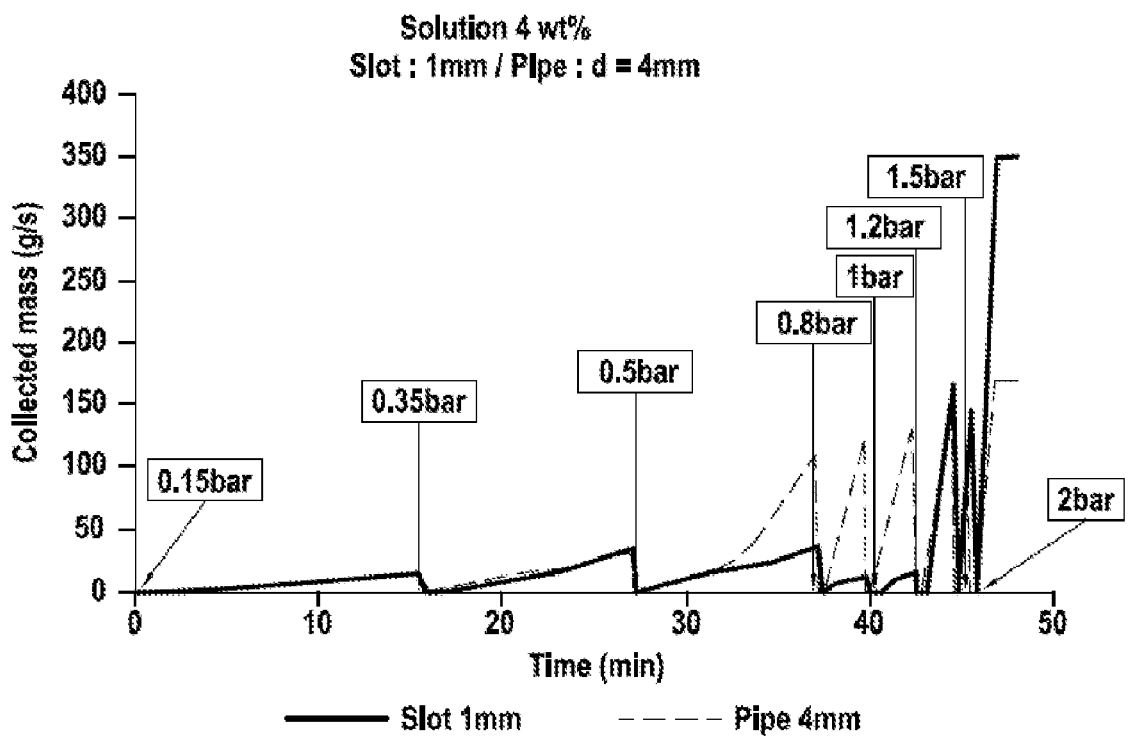

FIGS. 6A and 6B show performance of systems according to the invention for EOR applications for tubing wherein diameters are internal diameters of tubings. FIG. 7 shows performance of systems according to the invention for EOR applications for slot alone wherein the slot dimensions were length 55 centimeters, with width 40 millimeters and thickness 1 millimeter. These curves validate the inversion of the flows rate from bigger to smaller apertures. With a 5% solution, the critical shear is obtained at lower applied pressure. FIGS. 8A and 8B show performance of systems according to the invention for EOR applications for combination of tubing, inversion of flow are still observed in such configuration. FIGS. 9A and 9B show performance of systems according to the invention for EOR applications for combination of tubing and slot, again inversion of flows is observed after the gelation point, but initial viscous behavior is observed above the gel destruction point is reached.

Among the different chemistries described, the main system described here is based on LAPONITE (registered Trade Mark) and PolyEthyleneOxide (PEO) combinations. LAPONITE is a synthetic clay, which effectively interacts with PolyEthyleneOxide polymers when the molecular weight is optimized, to generate shear-gelling solutions (or so-called "shake gels"). Supplied as a fine white powder, LAPONITE swells to produce a clear, colorless thixotropic gel when dispersed in water.

For the first type of shear-gelling systems according to the invention, in a preferred embodiment, amphiphilic synthetic polymers combined with LAPONITE/PEO systems are used. Initial testing gave positive results in terms of shear induced gelation. LAPONITE/PEO systems appeared to be stabilized by the amphiphilic synthetic polymers. Effectively, a longer relaxation time appears.

For the second type of shear-gelling systems according to the invention, in a preferred embodiment, amphiphilic hydrophobically modified biopolymers with LAPONITE/PEO systems are used. For example, natural guars (supplied by Lamberti) or HEC (supplied by Hercules Aqualon) can be used, associative Xanthan gum (supplied by Lamberti) can also be used and a pre-mixture of the two previous ones can also be used. The benefit of the second type of shear-gelling systems is their lower cost and the ease to be industrially manufactured. It is also possible with them to play with the influence of polymer structure and conformation to generate and develop preferentially specific intermolecular interactions, which are preferred to promote shear-gelling properties.

All these systems (of the first or second type) are able to develop shear thickening and/or shear gelling properties. The basic trend was also validated with a shear-thickening fluid based on corn starch.

By this way, optimization of system properties can be globally optimized by adjusting the ratio of adsorbed and non-adsorbed polymers able to generate or not the intermolecular or inter-particle interactions, which develop shear-gelling properties. We can optimize critical shear rates for liquid/gel transition or relaxation times for gel/liquid transition, which are also essential to get efficient properties for the field applications.

The following example is focused on a preferred embodiment of a LAPONITE/PEO based system:
  a) Many LAPONITE grades are commercially available from Rockwood (RD, RDS, etc. . . . ). The best systems observed to get efficient "shake-gels" were obtained using the RDS grade. RDS provides a lower initial viscosity, which is better for the application.
  b) Different PEOs were evaluated with varying molecular weight Mw, up to $4\times10^6$ g/mol, and the best systems to get "shake gels" were obtained using PEO with Mw=300,000 g/mol.

The invention claimed is:

1. A composition having shear-gelling and shear-thickening properties, comprising an amphiphilic polymer, hydrophilic particles and polyethyleneoxide, wherein the hydrophilic particles consist of a synthetic clay that is a hydrous sodium lithium magnesium silicate.

2. The composition of claim 1, wherein the amphiphilic polymer is a synthetic polymer and/or a hydrophobically modified biopolymer.

3. The composition of claim 1, wherein the ratio for respective combinations synthetic clay/polyethyleneoxide is between 3.5 and 3.7.

4. A method for enhancing oil recovery including displacing formation fluids, comprising:
  (i) pumping a composition into a reservoir formation, the composition having shear-gelling and shear-thickening properties, comprising an amphiphilic polymer, hydrophilic particles and polyethyleneoxide, wherein the hydrophilic particles consist of a synthetic clay that is a hydrous sodium lithium magnesium silicate, wherein the composition experiences a distribution of velocities and shear rates in the formation; and
  (ii) injecting a displacement fluid into the reservoir formation behind the composition.

5. The method of claim 4, wherein the composition gels when subjected to a shear rate that exceeds a critical value.

6. The method of claim 4, wherein the gelling of the composition occurs within a time period shorter than one minute.

7. The method of claim 4, wherein the shear-gelling fluid properties of the composition are adjusted prior to injection depending on the expected distribution of velocities within the reservoir formation.

8. The method according to claim 4, wherein a gel formed from the composition remains stable for a period of time after the shear rate to which the composition is exposed falls below a critical value.

* * * * *